(12) United States Patent
Abernathy (10) Patent No.: US 8,130,211 B2
(45) Date of Patent: Mar. 6, 2012

(54) ONE-TOUCH ROTATION OF VIRTUAL OBJECTS IN VIRTUAL WORKSPACE

(75) Inventor: David N Abernathy, Everett, WA (US)

(73) Assignee: Microsoft Corporation, Redmond, WA (US)

( * ) Notice: Subject to any disclaimer, the term of this patent is extended or adjusted under 35 U.S.C. 154(b) by 970 days.

(21) Appl. No.: 11/860,283

(22) Filed: Sep. 24, 2007

(65) Prior Publication Data

US 2009/0079700 A1     Mar. 26, 2009

(51) Int. Cl.
*G06F 3/042* (2006.01)
(52) U.S. Cl. .................. 345/176; 345/156; 345/173
(58) Field of Classification Search .................. 345/173, 345/174, 178, 184, 156, 158; 178/19.01, 178/18.01–18.09; 715/856
See application file for complete search history.

(56) References Cited

U.S. PATENT DOCUMENTS

| | | | |
|---|---|---|---|
| 6,307,539 B2 | 10/2001 | Suzuki | |
| 6,323,846 B1 | 11/2001 | Westerman et al. | |
| 6,921,336 B1 | 7/2005 | Best | |
| 6,972,749 B2 | 12/2005 | Hinckley et al. | |
| 6,999,124 B2 * | 2/2006 | Woodworth | 348/333.01 |
| 7,007,236 B2 | 2/2006 | Dempski et al. | |
| 7,215,323 B2 | 5/2007 | Gombert et al. | |
| 7,701,447 B2 * | 4/2010 | Lii et al. | 345/173 |
| 2004/0166930 A1 * | 8/2004 | Beaulieu et al. | 463/25 |
| 2005/0156890 A1 | 7/2005 | Wierzoch | |
| 2006/0010400 A1 | 1/2006 | Dehlin et al. | |
| 2006/0094503 A1 * | 5/2006 | Ajioka et al. | 463/32 |
| 2006/0161870 A1 | 7/2006 | Hotelling et al. | |
| 2006/0189385 A1 | 8/2006 | Nakajima et al. | |

OTHER PUBLICATIONS

Microsoft Launches New Product Category: Surface Computing Comes to Life in Restaurants, Hotels, Retail Locations and Casino Resorts, May 29, 2007, Microsoft Corporation, pp. 1-2 .
Moscovich, "Multi-touch Interaction", Apr. 22-27, CHI 2006, pp. 1-4.
"Two Handed", Tactiva, 2005, p. 1.
Westerman, "Hand Tracking, Finger Identification, and Chordic Manipulation on a Multi-Touch Surface", Wayne Westerman, 1999, p. 363.

* cited by examiner

*Primary Examiner* — Lun-Yi Lao
*Assistant Examiner* — Shaheda Abdin
(74) *Attorney, Agent, or Firm* — Alleman Hall McCoy Russell & Tuttle LLP (57) ABSTRACT

A method of rotating a virtual object within a virtual workspace. The method includes recognizing a selection perimeter of the virtual object and detecting a one-touch user input having a starting location within the selection perimeter of the virtual object. The method further includes tracking movement of the one-touch user input within the virtual workspace, and rotating the virtual object within the virtual workspace responsive to tracked movement of the one-touch user input relative to the virtual object.

20 Claims, 6 Drawing Sheets

ONE-TOUCH ROTATION OF VIRTUAL OBJECTS IN VIRTUAL WORKSPACE

BACKGROUND

A variety of different user interfaces have been developed in order to allow humans to control machines. In the world of computers, various different graphical user interfaces are used in an attempt to make using a computer more intuitive. One popular graphical user interface utilizes a desktop metaphor. The desktop metaphor uses a computer display as a virtual desktop upon which documents and folders of documents can be placed. Documents can take the form of text documents, photographs, movies, and various other content. A document can be opened into a window, which can represent a paper copy of the document placed on the virtual desktop.

While much work has been put into advancing the desktop metaphor, users continually seek easier ways to interact with digital content.

SUMMARY

A one-touch rotation method for use within a graphical user interface is provided. The one-touch rotation method allows a user to rotate, and sometimes move, a virtual object within a virtual workspace. Rotation of the virtual object can be achieved using a one-touch user input, such as a one-finger gesture. The one-touch rotation method includes recognizing and tracking a one-touch user input, and rotating the virtual object responsive to the tracked movement of the one-touch user input.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

The present disclosure is directed to a method of rotating and moving virtual objects within a virtual workspace using a one-touch user input. The following description provides a surface computing system as one possible example of a virtual workspace environment in which such a one-touch user input can be performed. However, other virtual workspace environments can be used in accordance with the present disclosure. For example, where the below description refers to a user gesture in the form of a single finger interacting with the input surface of a surface computing system, it should be understood that a functionally analogous input may take the form of a computer mouse controlling a virtual pointer.

The one-touch move and rotate methods described below are considered to be applicable across a wide range of virtual workspace environments and should not be limited to surface computing systems. As such, description of a one-touch user input can be interpreted as including one-finger gestures without necessarily being restricted to one-finger gestures performed on a surface computing system. Similarly, it should be understood that the description of a one-finger gesture in the context of a surface computing system may be equally applicable to another type of one-touch user input.

As used herein, a one-touch user input can include, but is not limited to, a one-finger gesture that begins with a single finger touching an input surface, continues with the single finger moving across the input surface, and ends with the single finger lifting off of the input surface. A corresponding one-touch user input executed with a computer mouse can begin with the pressing and holding of the mouse button, can continue with the movement of a pointer on the screen responsive to movement of the mouse, and can end with release of the mouse button. Other one-touch user inputs are within the scope of this disclosure.

Figure 1:
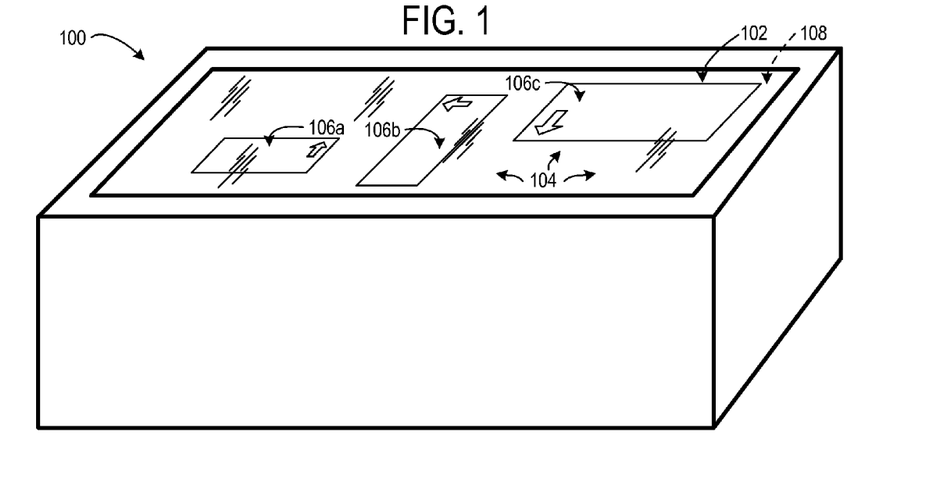
FIG. 1 shows an example embodiment of a surface computing system configured to perform a one-touch rotation of a virtual object within a virtual workspace.
Figure 2A:
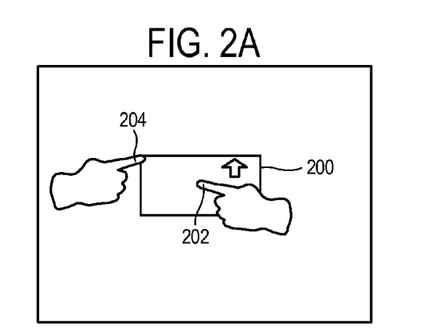
FIGS. 2A, 2B, 2C, and 2D collectively show two-finger rotation of a virtual object within a virtual workspace.
Figure 2B:
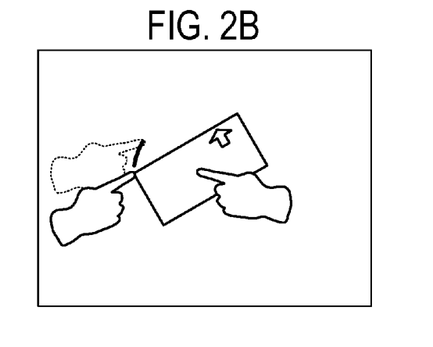
Figure 2C:
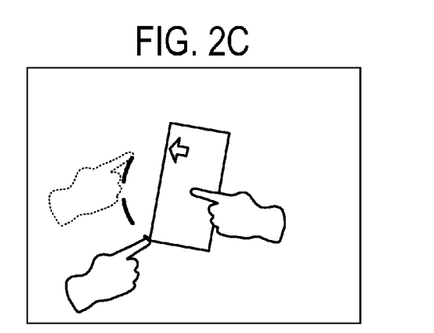
Figure 2D:
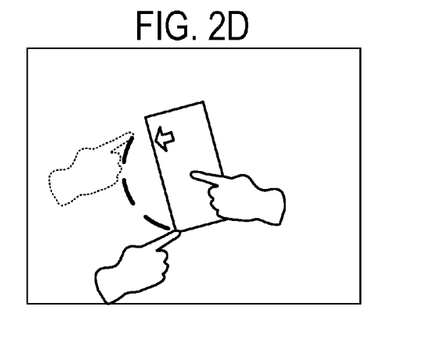

FIG. 1 shows a nonlimiting example of a surface computing system 100. Surface computing system 100 includes a display 102 for presenting a virtual workspace 104. A virtual workspace can include one or more virtual objects, such as digital photographs, calendars, clocks, maps, applications, documents, etc. Virtual workspace 104 includes virtual objects 106a, 106b, and 106c, which are schematically represented as rectangles.

Display 102 is operatively aligned with an input surface 108 that is configured to translate user input into commands for controlling the surface computing system. As an example, input surface 108 allows a user to interact with a virtual object by touching the input surface at the location where the virtual object is displayed. As used herein, this may be referred to as "touching" the virtual object. A user can move, resize, rotate, or otherwise modify a virtual object within the virtual workspace by touching the virtual object and executing a particular input gesture.

The input surface may recognize and track user input via a touch sensitive surface, such as a capacitive and/or resistive touch screen. The input surface can additionally or alternatively recognize and track user input via an optical monitoring system that effectively views the input surface to detect finger movement at or around the input surface. These or other input mechanisms can be used without departing from the scope of the present disclosure. As used herein, the term input surface is used to refer to the actual surface with which a user interacts, as well as any complementary electronics or other devices that work to translate user input into commands that can be used to control the surface computing system.

As shown in FIGS. 2A, 2B, 2C, and 2D, one method of rotating a virtual object within a virtual workspace is performed with a two-finger gesture. The two-finger rotate gesture begins by first touching a virtual object 200 with a first finger 202. The first finger creates a pivot point around which the virtual object can rotate. A second finger 204 then touches another part of the virtual workspace and rotates around the first finger. As the second finger rotates around the first finger, the virtual object rotates in place, as if spun around the first finger by the second finger.

A two-finger rotate gesture has several shortcomings. The two-finger rotate gesture can be difficult for users that do not have the full use of all fingers. Furthermore, the two-finger rotate gesture is most easily performed using fingers from two different hands, thus restricting a user from using an off hand to perform a different task, because both hands are occupied executing the gesture. It can be very difficult to rotate a virtual object more than 360 degrees, or even more than 180 degrees, using a two-finger rotate gesture. This is because most users do not have sufficient flexibility or coordination to perform the gesture throughout an extended range of rotation. Also, it can be difficult to teach new users a two-finger rotate gesture, especially in a commercial setting where users often do not have time to learn non-intuitive gestures.

Figure 3:
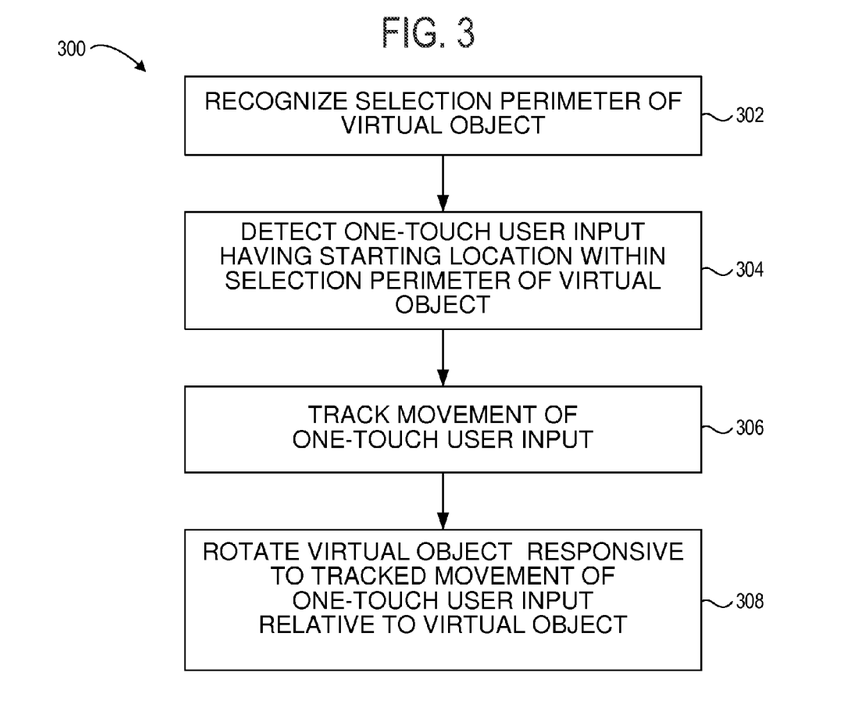
FIG. 3 is a process flow diagram showing a one-touch method of rotating a virtual object within a virtual workspace.

FIG. 3 is a process flow diagram showing a method 300 of rotating a virtual object within a virtual workspace. Method 300 overcomes at least some of the shortcomings of the two-finger rotate gesture, because method 300 can be performed using a single finger, or another single input that is analogous to a single finger. Method 300 includes, at 302, recognizing a selection perimeter of the virtual object.

The selection perimeter of a virtual object defines the area in which a user can touch, or otherwise select, a virtual object in order to initiate a rotate gesture. The selection perimeter for any particular virtual object can be selected based on a number of different considerations. For example, a relatively large selection perimeter can be used in order to make selecting a virtual object easier. On the other hand, a relatively small selection perimeter can be used to limit interference with other virtual objects.

Figure 4A:
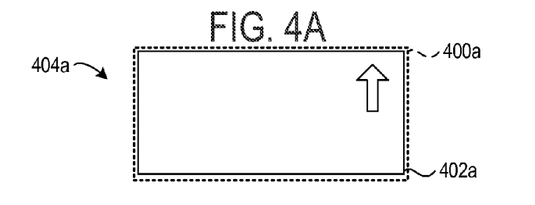
FIG. 4A shows a virtual object having a selection perimeter that is larger than its display perimeter.
Figure 4B:
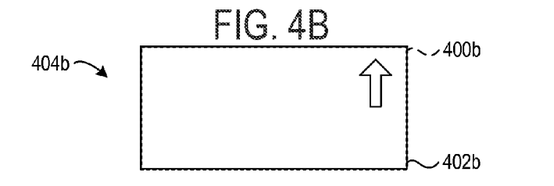
FIG. 4B shows a virtual object having a selection perimeter that coincides with its display perimeter.
Figure 4C:
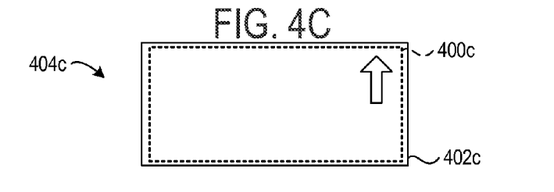
FIG. 4C shows a virtual object having a selection perimeter that is smaller than its display perimeter.

It should be understood that the disclosed one-touch move and rotate gestures can be used with a virtual object having a selection perimeter of virtually any size and/or shape. FIG. 4A shows an example in which a selection perimeter 400a is larger than a display perimeter 402a of a virtual object 404a. FIG. 4B shows an example in which a selection perimeter 400b coincides with a display perimeter 402b of a virtual object 404b. FIG. 4C shows an example in which a selection perimeter 400c is smaller than a display perimeter 402c of a virtual object 404c.

Figure 5A:
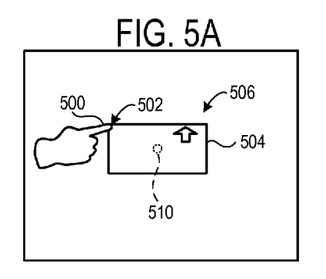
FIGS. 5A, 5B, 5C, and 5D collectively show one-touch rotation without movement of a virtual object within a virtual workspace.

Turning back to FIG. 3, method 300 includes, at 304, detecting a one-touch user input having a starting location within the selection perimeter of the virtual object. As used herein, in the context of a surface computing system, a one-touch user input is a user input that can be performed using a single finger, as contrasted with a two-touch user input that uses two fingers. FIG. 5A shows the beginning of an example of an one-touch user input. In particular, FIG. 5A shows a finger 500 touching a starting location 502 within a selection perimeter 504 of a virtual object 506. In this example, the selection perimeter coincides with the display perimeter of the virtual object. A one-touch user input can be detected and tracked by an input surface of a surface computing system or another suitable input mechanism.

Turning back to FIG. 3, method 300 includes, at 306, tracking movement of the one-touch user input within the virtual workspace. The method further includes, at 308, rotating the virtual object within the virtual workspace responsive to tracked movement of the one-touch user input relative to the virtual object within the virtual workspace.

Figure 5B:
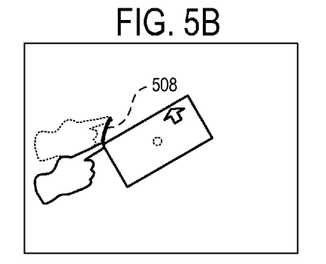
Figure 5C:
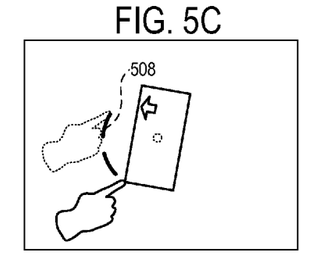
Figure 5D:
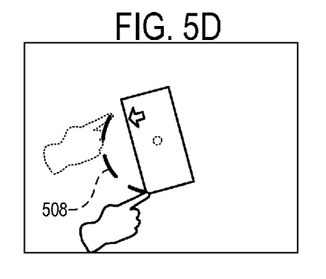
Figure 6A:
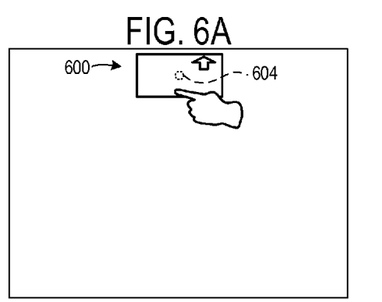
FIGS. 6A, 6B, 6C, and 6D collectively show one-touch movement without rotation of a virtual object within a virtual workspace.
Figure 6B:
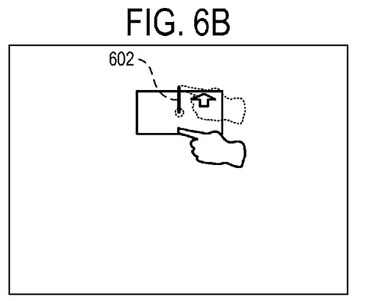
Figure 6C:
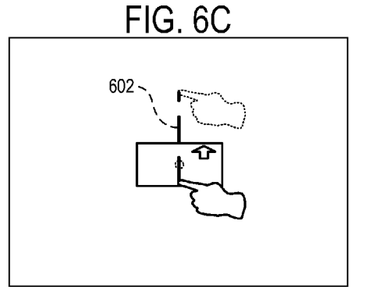
Figure 6D:
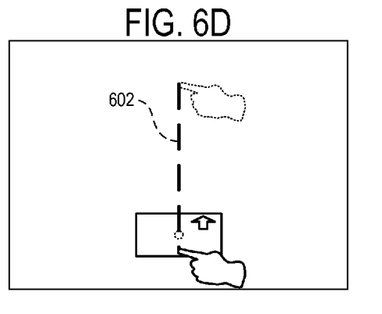
Figure 7A:
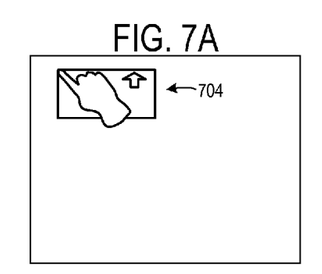
FIGS. 7A, 7B, 7C, and 7D collectively show one-touch rotation and movement of a virtual object within a virtual workspace.
Figure 7B:
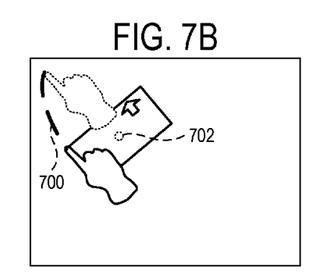
Figure 7C:
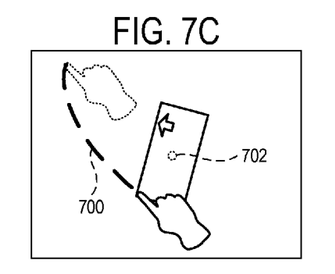
Figure 7D:
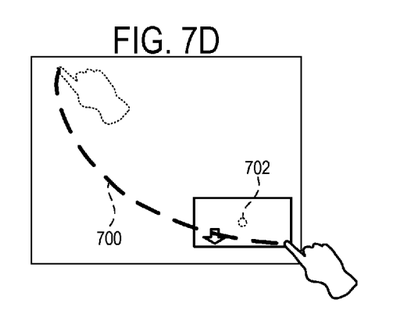

FIGS. 5B, 5C, and 5D show the continuation of a one-touch user input, as represented by gesture path 508. As the one-touch user input progresses along gesture path 508, virtual object 506 is rotated responsive to the one-touch user input. A virtual object may include a virtual anchor 510, around which the virtual object pivots. The virtual anchor may be located at approximately a center of the virtual object, although this is not required.

As shown in FIGS. 5B, 5C, and 5D, the rotation direction of virtual object 506 within the virtual workspace can be made to track the rotation direction of the one-touch user input about the virtual anchor. In other words, using FIGS. 5B, 5C, and 5D as an example, because gesture path 508 travels in a counterclockwise direction around the virtual anchor, the virtual object rotates in a counterclockwise direction. Furthermore, a magnitude of rotation of the virtual object within the virtual workspace can be made to track a magnitude of rotation of the one-touch user input about the virtual anchor. In other words, using FIG. 5C as an example, because gesture path 508 travels approximately 100 degrees around the virtual anchor, the virtual object rotates approximately 100 degrees.

As can be seen from the above described example, a single finger, or other analogous input, can intuitively rotate a virtual object by simply touching the virtual object and then rotating around the virtual object. A second finger is not needed to anchor the virtual object and define a pivot point. A virtual anchor serves as a predefined pivot point around which the virtual object can rotate. The magnitude and direction of rotation can be controlled by the gesture path traced by the finger.

The orientation of the virtual object may be changed responsive to the angular rotation of the one-touch user input relative to the virtual anchor. As the one-touch user input moves around the virtual anchor, the virtual object rotates responsively, as described above. If the distance between the one-touch user input and the virtual object does not change throughout the gesture path, the virtual object does not move. In other words, if the one-touch user input traces a substantially perfect circle around the virtual anchor, the virtual object may rotate without moving. As used herein, the term move refers to the non-rotational translation of a virtual object. A virtual object that translates from side-to-side is considered to move, while a virtual object that rotates in place is considered not to move. The virtual anchor can remain substantially stationary when a virtual object does not move, even if the virtual object rotates.

In some embodiments, a virtual object can be made to rotate and move responsive to the same one-touch user input. Movement of a virtual object can be controlled by the relative distance between the one-touch user input and the virtual anchor. If the distance between the one-touch user input and the virtual anchor increases, the virtual object can be pulled towards the one-touch user input. If the distance between the one-touch user input and the virtual anchor decreases, the virtual object can be pushed away from the one-touch user input.

FIGS. 6A, 6B, 6C, and 6D collectively show a virtual object 600 being pulled by a one-touch user input having a substantially straight gesture path 602 directly away from a virtual anchor 604. Because the gesture path does not rotate about the virtual object, the virtual object does not rotate. While the illustrated example shows the virtual object being pulled straight down, it should be understood that a virtual object can be pushed or pulled in any direction without rotation by a one-touch user input with a substantially straight gesture path.

FIGS. 7A, 7B, 7C, and 7D collectively show a one-touch user input that traces a gesture path 700 that rotates about a virtual anchor 702 and changes distance relative to the virtual anchor. In other words, the gesture path is neither a substantially perfect circle about a virtual anchor nor a straight line to or form the virtual anchor. Virtual object 704 rotates in a counterclockwise direction as the gesture path rotates about the virtual anchor in a counterclockwise direction, and the virtual object is pulled diagonally from the top-left corner of the virtual workspace to the bottom-right corner as the gesture path moves away from the virtual anchor in that direction.

It is believed that a combined move and rotate uses much less user coordination when using a one-finger gesture than when using a two-finger gesture. A two-finger gesture moves the anchor finger with the virtual object, while the rotation finger rotates about the moving anchor finger. Such a maneuver is likely to cause fingers and arms to be crossed, thus preventing completion of the gesture.

A user may find it desirable to move a virtual object without rotating the virtual object in some circumstances. As discussed above, this can be accomplished by using a one-touch user input that traces a substantially straight gesture path. However, a user may not have the skill or the patience to trace a substantially straight gesture path in all circumstances.

Figure 8:
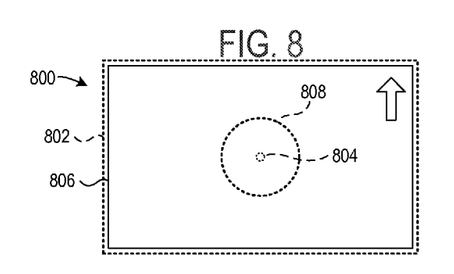
FIG. 8 shows a virtual object having a selection perimeter that is larger than its display perimeter and a rotation-free perimeter interior its selection perimeter.

In some embodiments, a virtual object may include a rotation-free perimeter interior its selection perimeter. For example, FIG. 8 shows a virtual object 800 that includes a selection perimeter 802 and a virtual anchor 804. The selection perimeter is larger than a display perimeter 806, although this is not required. Virtual object 800 also includes a rotation-free perimeter 808 interior selection perimeter 802.

A one-touch user input that originates interior the rotation-free perimeter can move the virtual object without rotating the virtual object, even if the gesture path rotates about the virtual anchor. A one-touch user input that originates between the selection perimeter and the rotation-free perimeter can move and rotate the virtual object, as described with reference to FIGS. 7A, 7B, 7C, and 7D. A one-touch user input that originates outside of the selection perimeter will neither move nor rotate the virtual object.

The selection perimeter and the rotation-free perimeter can be made virtually any size and/or shape. The example provided in FIG. 8 should not be considered in a limiting sense. Furthermore, it should be understood that the selection perimeter and the rotation perimeter can be invisible, although one or both can be visible in at least some embodiments.

Figure 9A:
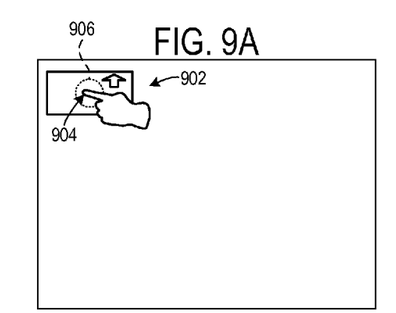
FIGS. 9A, 9B, and 9C collectively show one-touch movement without rotation of a virtual objection within a virtual workspace.
Figure 9B:
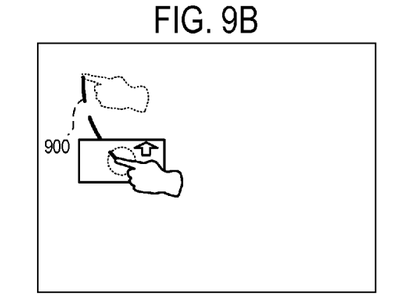
Figure 9C:
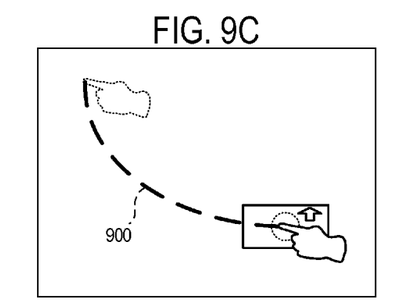
Figure 10A:
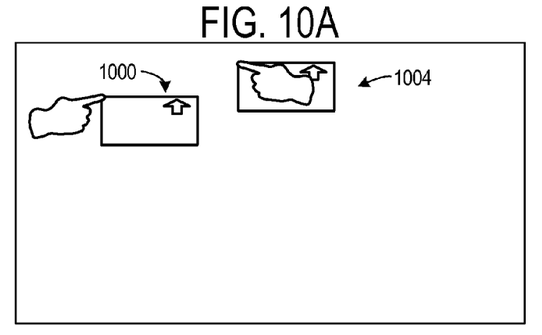
FIGS. 10A, 10B, 10C, and 10D collectively show one-touch rotation of a first virtual object using a first hand and one-touch rotation and movement of a second virtual object using a second hand.
Figure 10B:
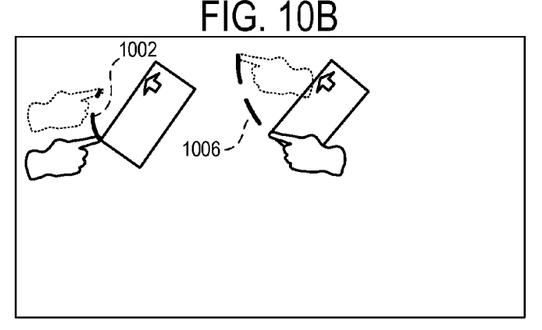
Figure 10C:
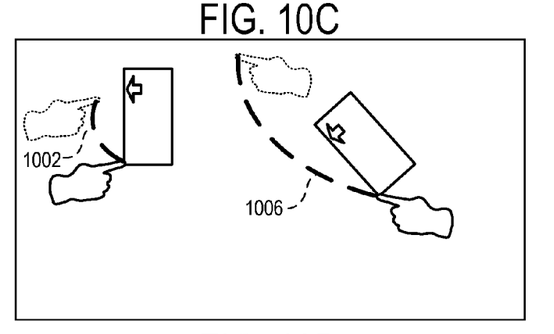
Figure 10D:
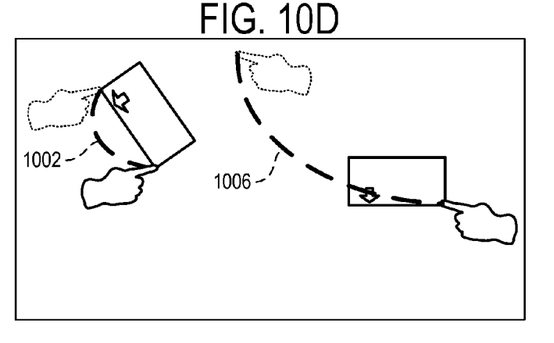
Figure 11A:
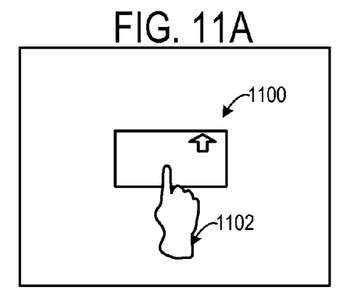
FIGS. 11A, 11B, 11C, and 11D collectively show one-touch rotation of a virtual object within a virtual workspace.
Figure 11B:
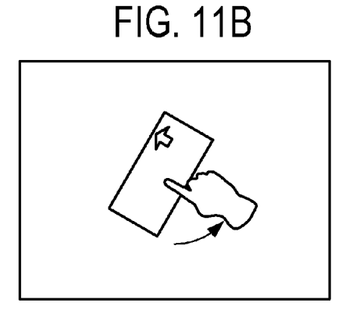
Figure 11C:
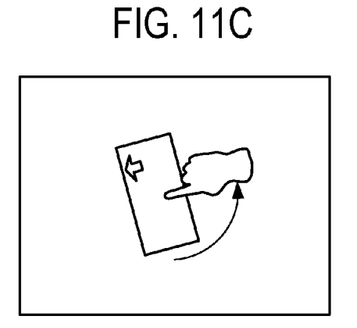
Figure 11D:
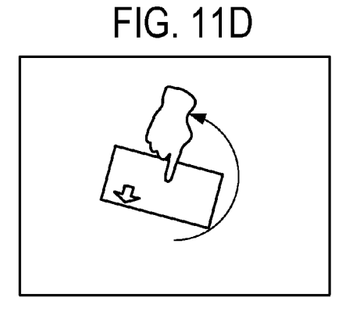
Figure 12A:
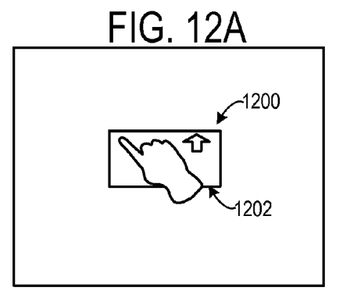
FIGS. 12A, 12B, 12C, and 12D collectively show one-touch rotation of a virtual object within a virtual workspace.
Figure 12B:
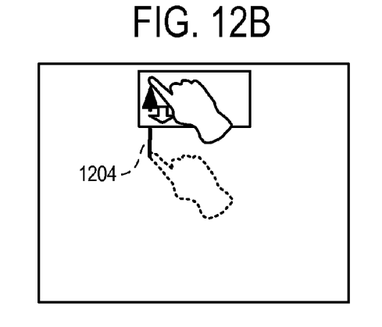
Figure 12C:
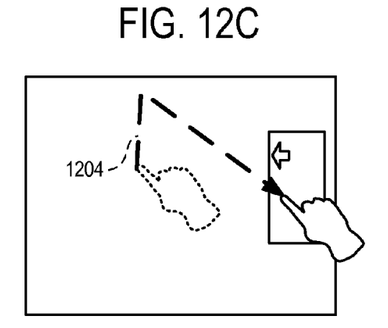
Figure 12D:
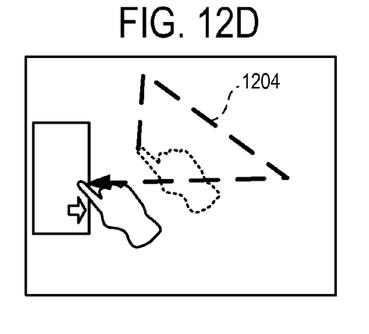

FIGS. 9A, 9B, and 9C collectively show a one-touch user input that traces a gesture path 900 substantially the same as gesture path 700 of FIGS. 7A, 7B, 7C, and 7D. Although the gesture paths are substantially the same, virtual object 902 of FIGS. 9A, 9B, and 9C does not rotate like virtual object 704 of FIGS. 7A, 7B, 7C, and 7D. Virtual object 902 does not rotate because the one-touch user input has a starting location 904 that originates within a rotation-free perimeter 906 of the virtual object.

In some circumstances, it may be desirable to move and rotate two or more virtual objects at the same time. Such a maneuver may be difficult using a two-finger gesture. However, using one-finger gestures, two virtual objects can be easily rotated and/or moved at the same time. For example, FIGS. 10A, 10B, 10C, and 10D collectively show a first virtual object 1000 being rotated in place by a one-finger gesture following a gesture path 1002, and a second virtual object 1004 being moved and rotated by a one-finger gesture following a gesture path 1006. This maneuver can be performed by a single user using two hands, or by two different users. It should be understood that virtually any number of one-finger move and rotate gestures can be performed at the same time.

A virtual object may additionally, or alternatively, be rotated responsive to the orientation of a hand performing a one-finger gesture. In particular, a surface computing system may include a hand orientation detector configured to track the orientation of a hand performing a one-touch gesture. The orientation of the virtual object can be rotated to match the detected rotation of the hand performing the one-finger gesture. This concept is illustrated in FIGS. 11A, 11B, 11C, and 11D. FIGS. 11A, 11B, 11C, and 11D collectively show a virtual object 1100 rotating responsive to the rotation of hand 1102.

A virtual object may additionally, or alternatively, be rotated responsive to the location of the virtual object within the virtual workspace. For example, a virtual object can be automatically rotated so as to have a predetermined orientation relative to an edge of the virtual workspace as the virtual object is moved towards the edge of the virtual workspace. As a nonlimiting example, a virtual object in the form of a digital photograph can automatically be rotated so that the bottom of the photograph faces the nearest edge of the virtual workspace. This concept is illustrated in FIGS. 12A, 12B, 12C, and 12D. FIGS. 12A, 12B, 12C, and 12D collectively show a virtual object 1200 automatically rotating so that a bottom edge 1202 of the virtual object faces the nearest edge of the virtual workspace as a one-finger gesture moves the virtual object within the virtual workspace along a gesture path 1204.

Although the subject matter of the present disclosure has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of moving and rotating a virtual object within a virtual workspace, the virtual workspace including an input surface operatively aligned with a display surface, the method comprising:

recognizing a rotation-permitting selection perimeter of the virtual object and a rotation-free selection perimeter interior the rotation-permitting selection perimeter;

detecting a one-touch user input from a touch on the input surface at a location where the virtual object is displayed, the one-touch user input having a starting location between the rotation-permitting selection perimeter of the virtual object and the rotation-free selection perimeter;

tracking movement of the one-touch user input within the virtual workspace; and moving and rotating the virtual object within the virtual workspace responsive to tracked movement of the one-touch user input relative to the virtual object.

2. The method of claim 1, further comprising recognizing a virtual anchor of the virtual object, where a direction of rotation of the virtual object within the virtual workspace tracks a direction of rotation of the one-touch user input about the virtual anchor.

3. The method of claim 2, where a magnitude of rotation of the virtual object within the virtual workspace tracks a magnitude of rotation of the one-touch user input about the virtual anchor.

4. The method of claim 1, further comprising recognizing a virtual anchor of the virtual object, where a direction of movement of the virtual object within the virtual workspace tracks a direction of movement of the one-touch user input relative to the virtual anchor.

5. The method of claim 1, where the rotation-permitting selection perimeter of the virtual object coincides with a display perimeter of the virtual object.

6. The method of claim 1, where the virtual object moves without rotating responsive to tracked movement of the one-touch user input when the starting location of the one-touch user input is interior the rotation-free selection perimeter of the virtual object.

7. The method of claim 1, where two or more virtual objects are rotated within the virtual workspace responsive to different one-touch user inputs.

8. The method of claim 1, where each one-touch user input is a one-finger gesture.

9. A method of rotating a virtual object within a virtual workspace of a surface computing system, the surface computing system including a display presenting the virtual object within the virtual workspace, the surface computing system also including an input surface operatively aligned with the display and configured to translate one-finger gestures on the input surface into commands for rotating the virtual object within the virtual workspace, the method comprising:
- displaying, with the display of the surface computing system, the virtual object within the virtual workspace, the virtual object at least partially characterized by a virtual anchor and rotation-permitting selection perimeter that does not extend past where the virtual object is displayed;
- detecting, with the input surface of the surface computing system, a one-finger gesture having a starting location between the rotation-permitting selection perimeter of the virtual object and a rotation-free perimeter interior the rotation-permitting selection perimeter;
- tracking movement of the one-finger gesture within the virtual workspace;
- rotating the virtual object within the virtual workspace responsive to tracked movement of the one-finger gesture relative to the virtual anchor such that a direction of rotation of the virtual object within the virtual workspace tracks a direction of rotation of the one-finger gesture about the virtual anchor and translating the virtual object within the virtual workspace responsive to tracked movement of the one finger gesture within the virtual workspace such that a direction of translation of the virtual object within the virtual workspace tacks a direction of movement of the one-finger-gesture relative to the virtual anchor.

10. The method of claim 9, further comprising moving the virtual object within the virtual workspace responsive to tracked movement of the one-finger gesture within the virtual workspace such that a direction of movement of the virtual object within the virtual workspace tracks the direction of movement of the one-finger gesture relative to the virtual anchor.

11. The method of claim 9, where a magnitude of rotation of the virtual object within the virtual workspace tracks a magnitude of rotation of the one-finger gesture about the virtual anchor.

12. The method of claim 9, where the selection perimeter of the virtual object coincides with a display perimeter of the virtual object.

13. The method of claim 9, further comprising recognizing a rotation-free perimeter of the virtual object interior the selection perimeter of the virtual object, where the virtual object moves without rotating responsive to tracked movement of the one-finger gesture when the starting location of the one-finger gesture is interior the rotation-free perimeter of the virtual object.

14. The method of claim 9, where two or more virtual objects are rotated within the virtual workspace responsive to different one-finger gestures.

15. A surface computing system, comprising:
- a display presenting a virtual object within a virtual workspace, the virtual object including a rotation-permitting selection perimeter and a rotation-free selection perimeter, the rotation-free selection perimeter interior to the rotation-permitting selection perimeter; and
- an input surface operatively aligned with the display and configured to translate a one-finger gesture into a command for rotating the virtual object within the virtual workspace when the one-finger gesture is executed between the rotation-permitting selection perimeter and the rotation-free selection perimeter, the input surface further configured to translate the one-finger gesture into a command for moving the virtual object without rotation within the virtual workspace when the one-finger gesture is executed within the rotation-free perimeter.

16. The surface computing system of claim 15, where the input surface translates the one-finger gesture into a command for rotating the virtual object within the virtual workspace such that a direction of rotation of the virtual object within the virtual workspace tracks a direction of rotation of the one-finger gesture about a virtual anchor of the virtual object.

17. The surface computing system of claim 15, where the input surface is further configured to translate the one-finger gesture into a command for moving the virtual object within the virtual workspace.

18. The surface computing system of claim 15, where two or more virtual objects are moved within the virtual workspace responsive to different one-finger gestures.

19. The surface computing system of claim 15, where the input surface includes a hand orientation detector, where tracking movement of the one-finger gesture within the virtual workspace includes tracking an orientation of a hand performing the one-finger gesture, and where the virtual object is rotated responsive to rotation of the hand performing the one-finger gesture.

20. The surface computing system of claim 15, where the input surface translates a one-finger gesture moving toward an edge of the virtual workspace into a command to automatically rotate the virtual object into a predetermined orientation relative to the edge of the virtual workspace.

* * * * *